United States Patent
Fernández Garcia et al.

(10) Patent No.: US 9,157,752 B1
(45) Date of Patent: Oct. 13, 2015

(54) SYSTEM AND METHOD FOR THEFT AND MEDICAL EMERGENCY EVENT FOR SELF-DRIVING VEHICLE

(71) Applicant: Continental Automotive Systems, Inc., Auburn Hills, MI (US)

(72) Inventors: Miguel A Fernández Garcia, Zapopan (MX); Perla Y Guzman Muñiz, Guadalajara (MX); Oscar I Suárez Ramirez, Tlaquepaque (MX); Jorge A Reyes Marquez, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/455,188

(22) Filed: Aug. 8, 2014

(51) Int. Cl.
*G01C 21/34* (2006.01)
*G05D 1/02* (2006.01)

(52) U.S. Cl.
CPC .............. *G01C 21/34* (2013.01); *G05D 1/0276* (2013.01)

(58) Field of Classification Search
USPC .......................................................... 701/25
See application file for complete search history.

(56) References Cited

U.S. PATENT DOCUMENTS

| | | | |
|---|---|---|---|
| 7,024,308 B2* | 4/2006 | Oesterling et al. | 701/420 |
| 7,421,321 B2* | 9/2008 | Breed et al. | 701/33.6 |
| 7,499,774 B2* | 3/2009 | Barrett et al. | 701/23 |
| 7,734,385 B2* | 6/2010 | Yang et al. | 701/23 |
| 8,280,583 B2* | 10/2012 | Stahlin et al. | 701/36 |
| 8,548,686 B2* | 10/2013 | Pisz | 701/45 |
| 8,700,251 B1* | 4/2014 | Zhu et al. | 701/25 |
| 8,718,861 B1* | 5/2014 | Montemerlo et al. | 701/26 |
| 8,880,273 B1* | 11/2014 | Chatham | 701/28 |
| 2006/0011399 A1* | 1/2006 | Brockway et al. | 180/272 |
| 2010/0256836 A1 | 10/2010 | Mudalige | |
| 2011/0177791 A1* | 7/2011 | Stahlin et al. | 455/404.2 |
| 2011/0295078 A1* | 12/2011 | Reid et al. | 600/300 |
| 2012/0083960 A1* | 4/2012 | Zhu et al. | 701/23 |
| 2012/0123644 A1* | 5/2012 | Waldmann | 701/45 |
| 2012/0271489 A1* | 10/2012 | Roberts et al. | 701/2 |
| 2014/0249721 A1* | 9/2014 | Schindler et al. | 701/41 |
| 2015/0025731 A1* | 1/2015 | Uehara | 701/23 |
| 2015/0051778 A1* | 2/2015 | Mueller | 701/23 |

* cited by examiner

*Primary Examiner* — Thomas Tarcza
*Assistant Examiner* — Alex C Dunn

(57) ABSTRACT

A system and method provides for autonomously driving a vehicle to a particular location during an emergency event. The method enables the vehicle to be driven autonomously. As a result of the emergency event, an input is provided to generate a request signal. Based on the request signal, the method 1) instructs the self-driving system to drive the vehicle to the particular location, and 2) sends, via an Internet connection, data to an entity remote from the vehicle.

17 Claims, 1 Drawing Sheet

SYSTEM AND METHOD FOR THEFT AND MEDICAL EMERGENCY EVENT FOR SELF-DRIVING VEHICLE

FIELD

The invention relates to a system and method for self-driving vehicles and, more particularly, to a system and method that directs a vehicle to autonomously drive to a particular location in the event of theft of the vehicle or a medical emergency relating to the operator of the vehicle.

BACKGROUND

There are times when an operator of an autonomously driven vehicle may have a health problem while traveling in the vehicle, preventing the operator from properly instructing the vehicle to drive to a place for the operator to receive treatment. Also, when a self-driving vehicle is stolen, there is currently a way to determine where that vehicle is located, but simply locating the stolen vehicle is not efficient, since law enforcement must be given this information and then must travel to such location to retrieve the stolen vehicle.

Thus, there is a need to provide a system and method for a autonomously driven vehicle such that during an emergency health situation of an operator, the system will self-drive the vehicle to the nearest treatment center and if the vehicle is stolen, will self-drive the vehicle to a particular location, such as a police station.

SUMMARY

An objective of the invention is to fulfill the need referred to above. In accordance with the principles of an embodiment, this objective is obtained by providing a system for autonomously driving a vehicle to a particular location based on an emergency event. The system includes a self-driving system constructed and arranged to autonomously drive the vehicle. An input is constructed and arranged to generate a request signal. A response unit is constructed and arranged, based on the request signal, to instruct the self-driving system to drive the vehicle to the particular location. A transceiver is associated with the response unit. Based on the request signal, the transceiver is constructed and arranged to send, via an Internet connection, data to an entity remote from the vehicle.

In accordance with another aspect of an embodiment, a method provides for autonomously driving a vehicle to a particular location during an emergency event. The method enables the vehicle to be driven autonomously. As a result of the emergency event, an input is provided to generate a request signal. Based on the request signal, the method 1) instructs the self-driving system to drive the vehicle to the particular location, and 2) sends, via an Internet connection, data to an entity remote from the vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
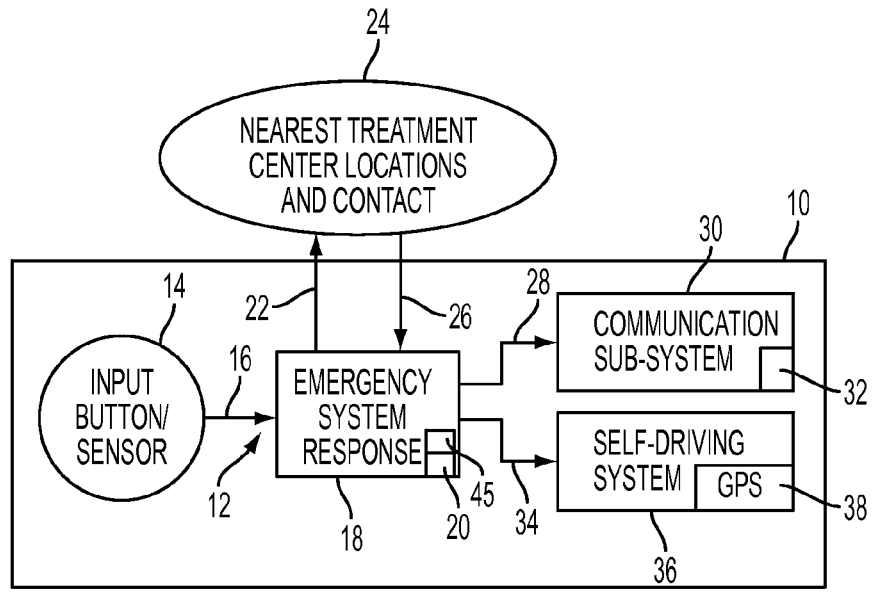
FIG. 1 is schematic illustration of a vehicle having a system in accordance with an embodiment for self-driving the vehicle to a nearest treatment center during a medical emergency event.

With reference to FIG. 1, an autonomously (self) driven vehicle 10 includes a system, generally indicated at 12, for autonomously operating (e.g., driving) the vehicle to move to a particular location due to the occurrence of an emergency event. The vehicle 10 is preferably always operated as an autonomously operated vehicle. An example of a suitable autonomous drive system for the vehicle 10 is disclosed in Patent Publication No. US 2010256836 A1, the content of which is hereby incorporated by reference into this specification, although other known autonomous drive systems can be used.

In the embodiment of FIG. 1, the system 12 is constructed and arranged to self-drive the vehicle 10 such as an automobile to the nearest medical treatment center (e.g., hospital) in the event of a medical emergency that prevents the operator (driver) from controlling the vehicle 10. The system 12 includes an input 14 such a manually actuated button located in the vehicle such as on the dashboard, or a sensor that senses driver incapacity such as whether the driver is slumped over in the driver's seat. Thus, the input 14 is initiated during a medical emergency event occurring in the vehicle 10. A request signal 16 from the input 14 is received by an emergency system response unit 18 in the vehicle 10. The response unit 18 includes a processor 20 and memory 45 and is constructed and arranged, based on receiving the request signal 16, to request the treatment center located nearest to the vehicle 10 by sending a current vehicle position signal 22 to an information server 24. The response unit 18 is preferably part of the electronic control unit of the vehicle 10. Alternatively, the location of the treatment center can be preset and stored in memory 45. Thus, the server 24 need not be provided.

The server 24 is preferably located remotely from the vehicle 10 at service provider and is in wireless communication with the response unit 18 such as by a transceiver 32 associated with the response unit 18. Transceiver 32 is preferably a conventional Cellular Internet Access device using a subscriber identification module (SIM) card or can employ any available Internet access technology such as, for example, a virtual SIM card or Code-Division Multiple Access (CDMA). Based on the current position of the vehicle 10, the server 24, via signal 26, returns the data, regarding the treatment center nearest to the vehicle and contact information of the treatment center, to the response unit 18. The data is stored in memory 45 of the response unit 18.

Based on signal 26, the response unit 18 sends a signal 28 to a communication sub-system 30 of the vehicle 10. The sub-system 30 then communicates with the treatment center to warn the treatment center that an emergency event is occurring and the treatment center is given the estimated time of arrival of the vehicle 10 at the treatment center as calculated by processor 20. This information sent to the treatment center is transmitted via the transceiver 32 preferably as a web page.

Also based on signal 26, the response unit 18 sends a signal 34 to a conventional self-driving system 36 of the vehicle 10 to instruct the system 36 to drive the vehicle to the nearest treatment center. The system 36 uses a Global Positioning System (GPS) 38 and other known inputs to autonomously drive the vehicle 10 in a conventional manner. The sub-system 30 with the transceiver 32 is shown separate from the response unit 18, but can be considered to be part of the response unit 18.

Thus, the system 12 of the embodiment of FIG. 1 advantageously directs the vehicle 10 to the nearest treatment center which may be much closer than if the driver selected a preset place to go, reducing the time needed to travel to the treatment center to receive assistance. The system 12 also communicates with the treatment center while the vehicle is en route so that personnel at the center are ready to receive and treat the operator of the vehicle.

Figure 2:
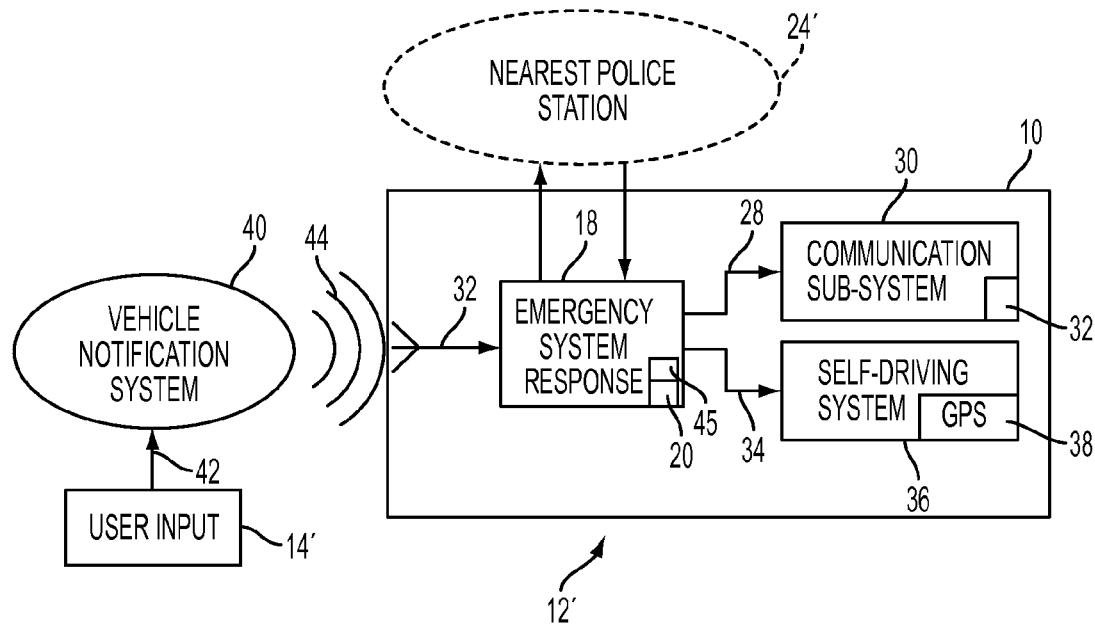
FIG. 2 is schematic illustration of a vehicle having a system in accordance with another embodiment for self-driving the vehicle to a particular location in the event that the vehicle is stolen.

FIG. 2 shows another embodiment of the system, generally indicated at 12', for self-driving the vehicle 10 to a particular location due to an occurrence of an emergency event. In this embodiment, the emergency event is theft or unauthorized use of the vehicle 10. If the owner of the vehicle 10 realizes that the vehicle has been stolen, he will request, remotely from the vehicle 10, to retrieve the vehicle by initiating a user request or input 14'. The input 14' is preferably a cell phone communication (e.g., phone call, mobile application, web page) sent to a vehicle notification system 40. A communication signal 42 is received by the notification system 40. Based on signal 42, the notification system 40 sends, via a wireless signal 44, information to the vehicle 10 commanding the vehicle 10 to autonomously drive to a location for safely recovering the vehicle such as a police station, as preset by the owner. For example, the preset location can be entered and stored in memory 45 of the response unit 18. A transceiver 32 associated with the response unit 18 receives the signal 44, via Cellular Internet Access using a SIM card or from any available Internet access technology. The response unit 18 determines the location of the vehicle 10 from the GPS 36 and the Internet connection (e.g., via SIM card). Based on the signal 44, the response unit 18 sends a signal 28 to the communication sub-system 30 of the vehicle 10. The sub-system 30 then communicates, using the transceiver 32, with the owner of the vehicle by employing the SIM card to send data, preferably in the form of a web page, text message, or mobile application to the owner indicating the status of the vehicle's retrieval. The owner's contact information can be preset into memory 45, with the processor 20 generating the text message, web page or mobile application data. The sub-system 30 with the transceiver 32 is shown separate from the response unit 18, but can be considered to be part of the response unit 18.

Also based on signal 44, the response unit 18 sends a signal 34 to the self-driving system 36 of the vehicle 10 instructing the system 36 to drive the vehicle 10 to the preset safe location (e.g., police station). The system 36 uses a Global Positioning System (GPS) 38 and other conventional inputs to autonomously drive the vehicle 10 in the conventional manner. Alternatively, since the preset safe location, e.g., police station, location may be far from where the stolen vehicle 10 is currently located, instead of using a preset police station location, the response unit 18 can optionally be in communication with a server 24', so as to locate the safe location (police station) nearest to the vehicle 10, similar to the server 24 in FIG. 1.

The system 12' of FIG. 2 uses a readily available mobile cell phone for the owner to communicate with a notification system in order to retrieve a stolen vehicle. Advantageously, the owner need not use a computer to initiate the retrieval request since computers are not readily available at site where a vehicle is stolen. Also, there is no need for the police to locate and retrieve the stolen vehicle, since the system 12' automatically delivers the vehicle to the police station without police input.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A system for autonomously driving a vehicle to a particular location based on an emergency event, comprising:
    a self-driving system constructed and arranged to autonomously drive the vehicle,
    an input constructed and arranged to generate a request signal,
    a response unit constructed and arranged, based on the request signal, to instruct the self-driving system to drive the vehicle to the particular location,
    a server in remote communication with the response unit, the response unit, based on the request signal, being constructed and arranged to request the particular location from the server based on an actual location of the vehicle and a distance that the particular location is from the vehicle, and
    a transceiver associated with the response unit, and based on the request signal, the transceiver being constructed and arranged to send, via an Internet connection, data relating to the emergency event to an entity that is remote from the vehicle.

2. The system of claim 1, wherein the input is a button in the vehicle that is constructed and arranged to be manual actuated to generate the request signal.

3. The system of claim 1, wherein the input is a sensor in the vehicle that is constructed and arranged to generate the request signal based on incapacity of an operator of the vehicle.

4. The system of claim 1, wherein the input is a mobile device remote from the vehicle that generate the request signal, the system further comprising a notification system that receives the request signal, the notification system being constructed and arranged to communicate wirelessly with the response unit so as to send a signal to the request unit based on the request signal.

5. The system of claim 1, wherein the self-driving system includes a global positioning system.

6. The system of claim 1, wherein the transceiver is a cellular Internet access device having a SIM card and is constructed and arranged to send a web page containing the data.

7. A method for autonomously driving a vehicle to a particular location during an emergency event, the method comprising the steps of:
    enabling the vehicle to be driven autonomously,
    as a result of the emergency event, providing an input to generate a request signal, and
    based on the request signal, 1) accessing a server, remote from the vehicle, to obtain a particular location based on an actual location of the vehicle and a distance that the particular location is from the vehicle, and instructing the self-driving system to drive the vehicle to the particular location, and 2) sending, via an Internet connection, data relating to the emergency event to an entity that is remote from the vehicle.

8. The method of claim 7, wherein the emergency event is theft of the vehicle and wherein the particular location is a location for safely recovering the vehicle.

9. The method of claim 8, wherein the entity is an owner of the vehicle and the sending step includes sending the data to the owner with the data indicating a status of the vehicle's retrieval.

10. The method of claim 9, wherein the step of sending the data includes sending the data using a cellular Internet access device having a SIM card located on the vehicle.

11. The method of claim 8, wherein the step of providing an input includes using a mobile device remote from the vehicle to send the request signal in a wireless manner to a notification system, the method further includes causing the notification system to communicate wirelessly with a response unit on the vehicle to initiate the response unit to perform the instructing and sending steps.

12. The method of claim 7, wherein the emergency event is a medical emergency of the operator of the vehicle and wherein the particular location is a medical treatment center.

13. The method of claim 12, wherein the entity is the medical treatment center and the sending step includes sending the data to the medical treatment center with the data including an indication that a medical emergency is occurring and an estimated time of arrival of the vehicle at the medical treatment center.

14. The method of claim 13, wherein the step of sending the data includes sending a web page containing the data, the web page being transmitted using a cellular Internet access device having a SIM card located on the vehicle.

15. The method of claim 12, wherein the step of providing an input includes actuating a button in the vehicle thereby sending the request signal to a response unit on the vehicle to initiate the response unit to perform the instructing and sending steps.

16. The method of claim 12, wherein the step of providing an input includes sensing a status of the operator of the vehicle and if the operator is determined to be incapacitated, sending the request signal to a response unit on the vehicle to initiate the response unit to perform the instructing and sending steps.

17. The system of claim 1, wherein the data relating to the emergency event includes an estimated time of arrival of the vehicle at the particular location.

\* \* \* \* \*